United States Patent [19]

Meyers

[11] 4,243,267
[45] Jan. 6, 1981

[54] SAFETY SUPPORTING DEVICES FOR REARWARDLY TILTABLE VEHICULAR CARGO BOXES

[76] Inventor: William G. Meyers, R.R. #1, Gretna, Nebr. 68028

[21] Appl. No.: 927,654

[22] Filed: Jul. 24, 1978

[51] Int. Cl.³ .............................................. B60P 1/04
[52] U.S. Cl. ................................... 298/17 B; 224/280
[58] Field of Search ............ 298/17 B; 224/280, 42.08; 217/60 R, 60 B; 292/262, 338

[56] References Cited

U.S. PATENT DOCUMENTS

| | | | |
|---|---|---|---|
| 116,641 | 7/1871 | Spalding | 298/17 B |
| 513,132 | 1/1894 | McClanathan | 298/17 B |
| 1,523,525 | 1/1925 | Hatashiti | 298/17 B |
| 2,407,012 | 9/1946 | Hutchinson | 298/17 B |
| 2,440,325 | 4/1948 | Bruno | 298/17 B |
| 3,183,037 | 5/1965 | Reichert | 298/17 B |
| 3,272,558 | 9/1966 | Rathman | 298/17 B |
| 4,138,158 | 2/1979 | Jones | 298/17 B |

FOREIGN PATENT DOCUMENTS 640727  5/1962  Canada ..................................... 298/17 B Primary Examiner—Stephen G. Kunin
Assistant Examiner—Terrance L. Siemens
Attorney, Agent, or Firm—George R. Nimmer

[57] ABSTRACT

Safety supporting devices to automatically securely maintain the rearwardly tilted elevated condition of the cargo dumping box of overland drayage vehicles are provided. The safety supporting device comprises an elongated multi-teeth rack freely pivotably depending from the dump box rearward portion and automatically securely engageable with a detent rigidly mounted to the vehicle chassis. The rack and detent combination maintains the selected degree of dump box rearward tilt. When it is later desired to allow the dump box to descend, vehicular personnel actuatably withdraw the rack from the detent, including desirable optional provision for remotely controlled withdrawal initiatable from the drayman's station e.g. the operator's cab of a dump truck.

12 Claims, 6 Drawing Figures

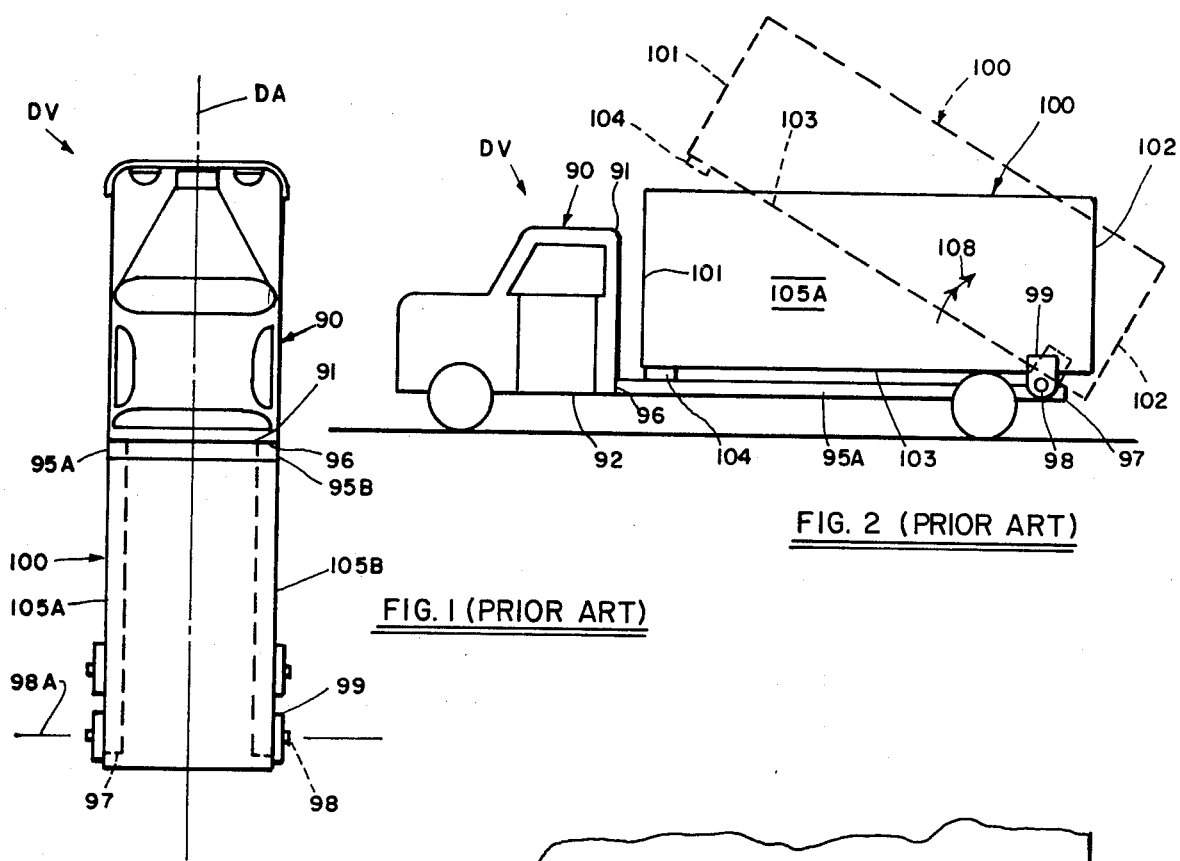
FIG. 1 (PRIOR ART)
FIG. 2 (PRIOR ART)
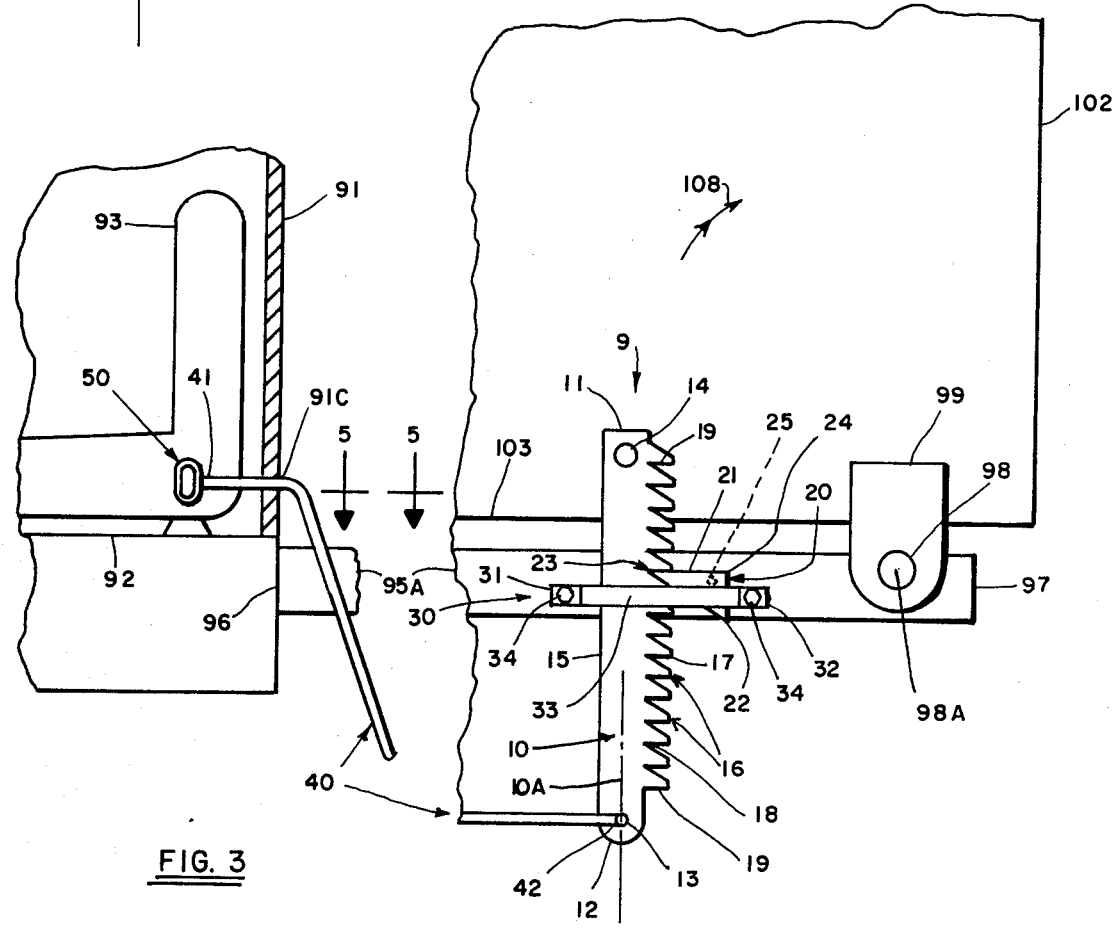
FIG. 3

SAFETY SUPPORTING DEVICES FOR REARWARDLY TILTABLE VEHICULAR CARGO BOXES

Overland drayage vehicles such as tractor-drawn farm wagons, dump trucks, etc., comprise a rearwardly tiltable cargo box for rearwardly dumping cargo. For example, the elevating mechanism for dump truck vehicles generally includes a system of pivotably connected levers interposed between the truck chassis and the rearwardly tiltable cargo dumping box, and driving means for operating the levers mechanism. Such driving means may be a power takeoff from the truck motor, motor operated winches, or hydraulic jacks actuated by hydraulic pumps connected to the truck motor. Unless some means is employed to prevent it, the rearwardly elevated cargo box might accidentally fall or descend by gravity at a time when it is imperative that the cargo box be retained in rearwardly tilted elevated condition. Such times most frequently occur when a malfunction of the elevation occurs and the presence of the truck operator or other personnel is required beneath the cargo box.

Typifying prior art in this general field of safety supporting devices for rearwardly tiltable vehicular cargo boxes are U.S. Pat. Nos. 0,513,132 and 3,183,037. However, such prior art devices require working personnel to station themselves at the safety device itself e.g. at the cargo box axis of tilt, for affirmatively actuatably engaging and for subsequently withdrawably disengaging same.

It is accordingly the general objective of the present invention to provide improved safety supporting devices for rearwardly tiltable vehicular cargo boxes, wherein the safety device is automatically engageable at the attained degree of cargo box' rearwardly tilted elevation whereby it is unnecessary for working personnel to station themselves immediately alongside the safety device for effecting engagement thereof. It is an ancillary general objective to provide safety supporting devices where desireable provision may be made to actuatably disengage same (thus allowing the cargo box to descend under safe conditions) from some remote location such as from the forwardly remotely located drayman's station. Among the other objectives is capability for ready and versatile installation of the safety devices onto numerous kinds, types, and styles of overland dump vehicles.

With the above and other objects and advantages in view, which will become more apparent as this description proceeds, the safety supporting devices of the present invention generally comprise; an elongate multi-teeth rack freely pivotably depending from a rearward portion of the cargo box; a detent attached at a rigidly established elevation of the vehicle, the configuration of the detent and the rack teeth being such that the rack teeth freely slide against the detent only while the cargo box and the pendulum-like rack are being moved upwardly by the cargo box elevating mechanism, but during attempted downward movement of the cargo box, the rack teeth automatically lockably engage with the detent thus automatically maintaining the attained degree of cargo box rearwardly tilted elevation; means for maintaining the rack in transversely urged condition; and means for longitudinally withdrawably disengaging the rack from the detent, and desireably controllably initiatable from the operator's cab or similar drayman's station, thus permitting the elevated cargo box to descend only after personnel have determined that it is a safe time to do so.

In the drawing, wherein like characters refer to like parts in the several views, and in which:

FIG. 1 is a top plan view of a typical prior art overland dump vehicle having a rearwardly tiltable cargo box and with which the safety supporting device concepts of the present invention might be employed;

FIG. 2 is a left side elevational view of FIG. 1, the right side elevational view being a mirror image; phantom line indicates a rearwardly tilted condition of the cargo box;

FIG. 3 is a side elevational view of a representative embodiment of the safety supporting device of the present invention in the FIG. 2 environment, the cargo box being in lowered non-tilted condition;

Figure 4:
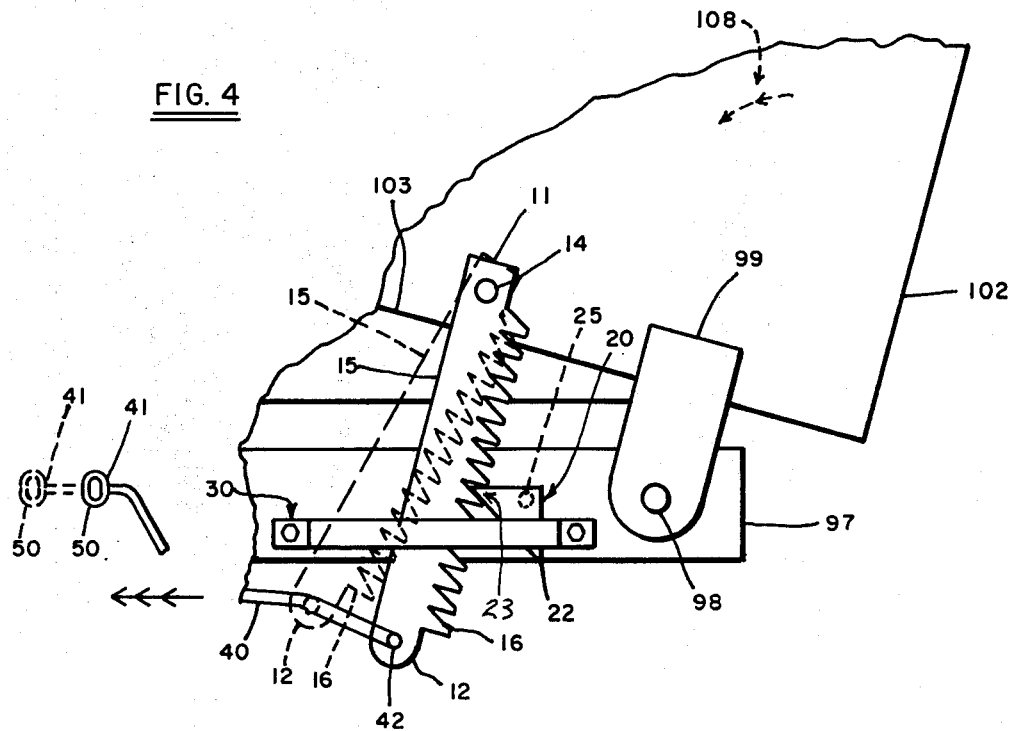
FIG. 4 is a side elevational view akin to FIG. 3 but with the cargo box at rearwardly tilted condition and stably supported thereat.

Turning initially to FIGS. 1 and 2 which depict a typical overland dumping vehicle environment, such as dump truck "DV", onto which the safety supporting device concept e.g. 9, of the present invention might be installed. PRIOR ART dump truck vehicle "DV" includes longitudinally horizontal underlying structure, such as chassis beams 95A and 95B located on opposite sides of and parallel to vehicle central-axis "DA". The cargo box 100 is located above underlying structure 95 and comprises: a transversely extending upright front-end 101, a transversely extending upright rear-end 102 that is either open or openable to permit rearward dumping discharge of cargo, upright sidewalls 105A and 105B located on opposite sides of and parallel to central-axis "DA", and a horizontal base-panel 103 maintained a slight distance above framework 95 such as by transverse frontal-bar 104 securely attached along and depending from front-end 101. Cargo box 100 is rearwardly tiltable about a transverse-axis connection 98A to a rearward location of chassis 95 whereby as indicated by double-headed curved arrow 108 in FIG. 2, cargo might be rearwardly dumped from the open or swing-gated rear-end 102. Conventional pivotal connection along the axis 98A might be effected with upright lugs 98 having the upper part welded or otherwise securely connected to sidewalls 105 adjacent rearend 102 and having the lower part pivotably secured as by pivot-pins 98 to the chassis 95 nearer to the back-end 97 than to head-end 96.

The rearwardly tiltable vehicular cargo box 95-100 normally includes forwardly remote drayage means which might be a tractor (not shown) removably hitched to the chassis head-end e.g. 96. However, in the dump truck "DV" embodiment depicted, the drayage means including operator's cab 90 is integrally joined to the chassis head-end 96. Operator's cab 90 typically includes an upright backwall 91 and an operator's seat 93 located above cab floor 92. For purposes of the present invention, backwall 91 is desireably provided with opening 91C.

Turning now to FIGS. 3 and 4, which illustrate a representative embodiment 9 of the safety supporting device as installed onto the prior art environment "DV" of FIGS. 1 and 2. Embodiment 9 generally comprises; an elongate multi-teeth rack 10 freely downwardly pivotal about pivot-pin connection 14 to the respective sidewalls 105A and 105B of cargo box 100, a constant-elevation detent 20 for the rack teeth 16, means (30) for transversely urging the rack 10 so that its teeth 16 are in longitudinal alignment with detent 20, means (40) for longitudinally directionally withdrawing the rack 10 from detent 20 to allow the cargo box 100 to descend under safe conditions, said means being preferably controllably initiatable (50, etc.) from the drayman's station e.g. 93.

Elongate racks 10 extend lengthwise along rack-axis 10A and include a top-end 11, a bottom-end 12, an elongate front-side 15 parallel axis 10A, and an elongate multi-teeth side 16. The rack upper portion immediately below top-end 11 is freely pivotably secured by transversely extending pivot-pin 14 to the cargo box respective sidewalls 105A and 105B at a position slightly forwardly axis 98A (though nearer rear-end 102 than to front-end 101). If it were not for the influences of the detent (20) and the rack actuation means (40), racks 10 would be freely downwardly pivotal in pendulum-like fashion from pivot-pin connections 14. In this vein, eventhough the cargo box might be rearwardly tilting about axis 98A, racks 10 would tend to remain vertically downwardly of the pivot-pin 14; however, as seen in FIG. 3, detent 20 keeps the rack from pivoting counterclockwise.

The configuration of the rack teeth 16 and the detent 20 are such that the teeth 16 of the freely pivotal rack 10 slide unidirectionally upwardly only against the detent 20 whereby if the cargo box (100) and its pendulum-like rack 10 commence to move downwardly, the fixed-elevation and non-rotatable detent 20 nevertheless maintains the dump box' attained elevation through the intervening sturdy teeth 16. For example, as seen in FIG. 3, the configuration for each of the identical rack teeth includes a "peak" 17, a "valley" 18, which define therebetween a flat underside 19 that is substantially perpendicular to rack-axis 10A. The configuration for the detent 20 includes a flat horizontal upperside 21 upon which the tooth underside might flatly downwardly rest. For example, a right-triangular shaped detent 20 very admirably suits the configuration criteria and includes: right-angle corner 24, bottom-corner 22, fore-corner 23 abuttable into "valley" 18, and the aforedescribed flat upperside 21. The topside of each tooth 16 slopes upwardly and forwardly of "peak" 17 and hence it oblique to rack-axis 10A. As clearly seen in FIG. 3, when the cargo box 100 is in the fully downward condition, most of the rack teeth will be in elevation below cargo box base-panel 103 and below the point 23 of detent 20. The detent, remote of cargo box 100, is stationarily and non-rotatably mounted to the vehicle framework e.g. 95, and at a fixed-elevation well below the rack pivot-pin connection.

There are means for transversely urging the racks 10 so as to maintain their teeth 16 in longitudinal alignment with the detent 20, thus ensuring that the teeth 16 will contact detent apex 23. Such means might take the form of an elongate horizontal strap 30 having its two ends 31 and 32 attached at fixed-elevation to chassis beams 95A and 95B as with threaded connectors 34. The medial-length portion 33 of straps 30 are transversely outwardly bowed with respect to ends 31-32 and the beams 95 whereby such medially bowed portion 33 defines a transversely extending gap from beam 95 and thus a longitudinally extending guidance means for the rack 10 therein. Enhancing ease and reliability of the safety device (9) installation, the detent 20 is preferably securely attached beforehand, as by welding, to the interior of strap medial-length 33. However, the detent fixed mounting might be effected or reinforced by one or more screws 25 or the like passing through the detent into the structural member e.g. 95.

Referring now to FIG. 4, which depicts the cargo box 100 maintained in the attained degree of rearwardly tilted elevated condition by a tooth underside 19 downwardly resting against the detent upperside 21. As indicated in phantom line in FIG. 4, there are means for longitudinally directionally withdrawing the rack teeth 16 from detent 20 whenever operating personnel desire to allow the cargo box to descend in the direction of curved arrow 108. Preferably, the rack longitudinal withdrawal is controllably initiated from the forwardly located drayman's station e.g. 93; in this vein, such means preferably exerts a longitudinally forward force to rack 10, as indicated in triple-headed straight arrow. For example, a longitudinally extending horizontal cable 40 might be so employed and having its rearward terminus 42 attached to the apertured (13) lower portion of rack 10. Elongate cable 40 passes through said opening 91C; to the cable forward terminus 41 alongside driver's station 93 is attached a manual-pull handle 50. Thus, as indicated in FIG. 4 phantom line, when the operator at forwardly remote station 93 exerts forward manual force upon cable 40 through handle 50, rack teeth 16 are longitudinally forwardly withdrawn from detent 20 and the cargo box is allowed to descend to its FIG. 3 downward condition.

Figure 6:
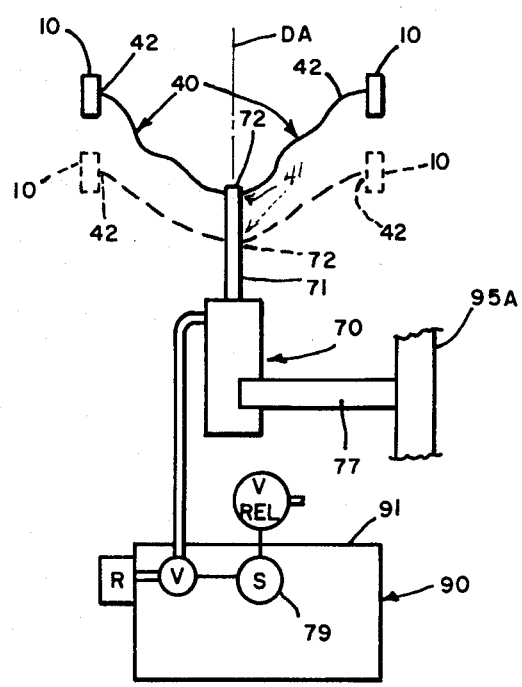
FIG. 6 is a sectional plan view similar to FIG. 5 and schematically indicating an alternate type non-manually powered means.
Figure 5:
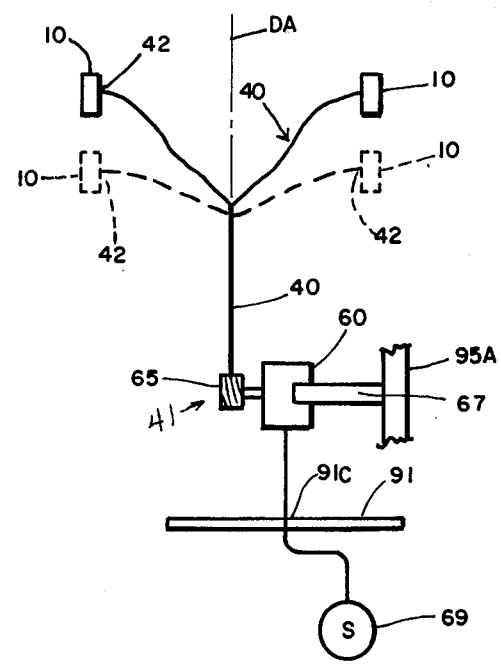
FIG. 5 is a sectional plan view taken in the direction of line 5—5 and schematically indicating non-manually powered means for longitudinally withdrawing the rack from the detent to allow the cargo box to descend.

Preferably, the forwardly remote actuation means for withdrawing the rack is non-manually powered, the control means therefor desireably taking the form of a control switch (69,79) located at the forward drayman's station e.g. within cab 90. Referring to FIG. 5, one such type non-manually powered means might be an electrically powered motor 60 securely mounted (67) to vehicle framework 95 and having a clutch-mounted pulley or "winch" 65 to wind the cable 40. Alternatively, as seen in FIG. 6, the non-manually powered means might take the form of a fluid-powered piston 70 securely mounted (77) to vehicle framework 95 and including a longitudinally reciprocatable plunger 71. The cable formed terminus 41 is attached to the plunger free-end 72. Fluid line 73 for piston 70 proceeds through said opening 91C into operator's cab 90 wherein is located control switch 79 for actuating plunger 71. Conventionally ancillary to the piston assembly 70 are fluid reservoir "R", valve "V", and pressure-relief valve "V.REL.".

From the foregoing, the construction and operation of the safety supporting devices will be readily understood and further explanation is believed to be unnecessary. However, since numerous modifications and changes will readily occur to those skilled in the art, it is not desired to limit the invention to the exact modes described, and accordingly, all suitable modifications and equivalents may be resorted to, falling within the scope of the appended claims.

What is claimed is as follows:

1. In combination with a rearwardly tiltable vehicular cargo box extending longitudinally along a central-axis and including a pair of longitudinal chassis members with the cargo dumping box located thereabove, a safety supporting device to automatically securely maintain the cargo dump box in rearwardly tilted elevated condition until released by vehicular personnel and comprising:

A. an elongate multi-teeth rack extending along a rack-axis and having an upper-end and a lower-end, the rack upper portion being freely pivotably secured with a transversely extending pivot-pin to the dump box forwardly of its transverse-axis connection to the chassis but nearer thereto than to the cargo box transversely extending front-end, the rack lower-end being located below the cargo box base panel;

B. a fixed-elevation and non-rotatable detent attached to the chassis and located wholly below the cargo box base panel and actuatably engageable with the rack, the configuration of the detent and the rack teeth being such that the teeth of the freely pivotably depending rack slide upwardly but not downwardly against the detent whereby as said rack commences to move downwardly said detent maintains the dump box tilted elevation through the intervening multi-teeth rack;

C. means attached to the chassis and located below the cargo box base panel for maintaining the rack in longitudinal alignment with the detent; and D. means for longitudinally directionally withdrawing the rack lower portion whereby the rack pivots at its pivot-pin and moves longitudinally away from the detent permitting the tiltably elevated cargo box to descend.

2. The combination of claim 1 wherein the rack teeth are on the rack rearward side; and wherein the means for longitudinally moving the rack lower portion is forceably extendable directionally forwardly of the rack.

3. The combination of claim 2 wherein there is a forwardly disposed drayman's station; and wherein the rack forward movement means is actuatable from the drayman's station and is actuatable with equal facility at tilted and non-tilted conditions of said cargo box.

4. The combination of claim 3 wherein the drayman's station is the operator's cab of a dump truck overland vehicle; and wherein there are control means within the operator's cab for remotely actuating the rack directionally forwardly away from the detent.

5. The combination of claim 4 wherein the remote actuation means is non-manually powered, the control means therefor being a control switch located inside the operator's cab.

6. The combination of claim 3 wherein the means for maintaining the rack in longitudinal alignment with the detent is a straplike guidance means attached to the beam whereby said rack and detent are located between the beam and the strap-like guidance means.

7. The combination of claim 6 wherein the two ends of the strap-like guidance means are attached to the beam, the medial-length portion being transversely separated from the beam.

8. The combination of claim 7 wherein the detent is of substantial right-triangular shape.

9. The combination of claim 1 wherein the means for maintaining the rack in longitudinal alignment with the detent is strap-like having its two ends attached to the beam and having a medial-length transversely separated from the beam and whereby the rack and detent are located between the beam and the strap-like guidance means.

10. The combination of claim 9 wherein the detent is rigidly attached to the strap-like guidance means.

11. The combination of claim 10 wherein there is a forwardly disposed drayman's station, the rack longitudinal withdrawal means being actuatable from the forwardly remote drayman's station.

12. The combination of claim 11 wherein the rack teeth are on the rack rearward side; wherein there is a forwardly disposed drayman's station; wherein the detent is of substantial right-triangular shape; and wherein the means for longitudinally moving the rack lower portion is forceably extendable directionally forwardly of the rack, and actuatable from the drayman's station, said means being actuatable with equal facility at tilted and non-tilted conditions of said cargo box.

* * * * *